United States Patent
Zhong et al.

(10) Patent No.: US 9,927,664 B2
(45) Date of Patent: Mar. 27, 2018

(54) PIXEL ELECTRODE AND LIQUID CRYSTAL DISPLAY PANEL

(71) Applicant: Shenzhen China Star Optoelectronics Technology Co., Ltd., Shenzhen (CN)

(72) Inventors: Xinhui Zhong, Shenzhen (CN); Yungjui Lee, Shenzhen (CN)

(73) Assignee: SHENZHEN CHINA STAR OPTOELECTRONICS TECHNOLOGY CO., LTD., Shenzhen, Guangdong (CN)

( * ) Notice: Subject to any disclaimer, the term of this patent is extended or adjusted under 35 U.S.C. 154(b) by 263 days.

(21) Appl. No.: 14/770,826

(22) PCT Filed: Jun. 18, 2015

(86) PCT No.: PCT/CN2015/081725
§ 371 (c)(1),
(2) Date: Aug. 27, 2015

(87) PCT Pub. No.: WO2016/176896
PCT Pub. Date: Nov. 10, 2016

(65) Prior Publication Data
US 2016/0349577 A1   Dec. 1, 2016

(30) Foreign Application Priority Data

May 7, 2015   (CN) .......................... 2015 1 0229777

(51) Int. Cl.
*G02F 1/1343*   (2006.01)
*G02F 1/1337*   (2006.01)
(Continued)

(52) U.S. Cl.
CPC ...... *G02F 1/134309* (2013.01); *G02F 1/1337* (2013.01); *G02F 1/1368* (2013.01);
(Continued)

(58) Field of Classification Search
CPC .......................................... G02F 2001/134345
See application file for complete search history.

(56) References Cited

U.S. PATENT DOCUMENTS

| | | | |
|---|---|---|---|
| 2011/0128492 A1* | 6/2011 | Kim ................. | G02F 1/133514 349/144 |
| 2015/0055069 A1* | 2/2015 | Cheng ............... | G02F 1/133707 349/123 |
| 2015/0070644 A1* | 3/2015 | Lee .................. | G02F 1/134309 349/142 |

FOREIGN PATENT DOCUMENTS

| | | |
|---|---|---|
| CN | 102193256 A | 9/2011 |
| CN | 104267548 A | 1/2015 |
| JP | P2004302260 A | 10/2004 |

\* cited by examiner

*Primary Examiner* — Phu Vu
(74) *Attorney, Agent, or Firm* — Leong C. Lei

(57) ABSTRACT

The present invention provides a pixel electrode and a liquid crystal display panel. The pixel electrode comprises a rectangular frame (40), a plurality of first strip pixel electrode branches (41), a plurality of second strip pixel electrode branches (42), a plurality of third strip pixel electrode branches (43) and a plurality of fourth strip pixel electrode branches (44), which are inside the rectangular frame (40), and connected with the rectangular frame (40), and because the pixel electrode does not including the (cross) keel, it is capable of solving the issue that the (cross) keel part of the pixel electrode causes the penetration rate reduction of the liquid crystal display panel to promote the penetration rate of the liquid crystal display panel for reducing the demand to the backlight brightness of the liquid crystal display panel and the usage power consumption. In the liquid crystal display panel of the present invention, the pixel electrode (4) thereof utilizes the structure not including the (cross) keel, (Continued)

and the penetration rate is higher, and the demand to the backlight brightness is lower, and the usage power consumption is lower.

10 Claims, 10 Drawing Sheets

(51) Int. Cl.
    *G02F 1/1362*     (2006.01)
    *G02F 1/1368*     (2006.01)

(52) U.S. Cl.
    CPC .... *G02F 1/13439* (2013.01); *G02F 1/133707* (2013.01); *G02F 1/136286* (2013.01); *G02F 2001/133742* (2013.01); *G02F 2001/134345* (2013.01); *G02F 2201/121* (2013.01); *G02F 2201/123* (2013.01)

PIXEL ELECTRODE AND LIQUID CRYSTAL DISPLAY PANEL

FIELD OF THE INVENTION

The present invention relates to a display technology field, and more particularly to a pixel electrode and a liquid crystal display panel.

BACKGROUND OF THE INVENTION

In recent years, the Thin Film Transistor-LCD (TFT-LCD) has been rapidly developed and applied widely. For the TFT-LCD in the mainstream market, three types, which respectively are Twisted Nematic (TN), Super Twisted Nematic (STN), In-Plane Switching (IPS) and Vertical Alignment (VA) can be illustrated. The VA liquid crystal display possesses extremely high contrast than the liquid crystal displays of other types, which can reach up to 4000-8000 in general. It has very wide application in large scale display, such as television or etc.

The reason why the VA liquid crystal display possesses extremely high contrast is that the liquid crystal molecules are vertically aligned to the substrate surface, and no phase difference exists, and light leakage is very small, and the dark state brightness is extremely small at the dark state without applying electricity. The lower the brightness at the dark state can be, the higher the contrast is according to the contrast calculation formula. For vertically aligning the liquid crystal molecules of the VA liquid crystal display to the substrate surface, it is demanded to implement vertical alignment treatment to the liquid crystal molecules. The most common way is to coat vertical alignment solution on specific areas of surfaces of the upper, lower substrates, and the alignment solution generally comprises a large amount of chemical solution NMP (N-methylpyrrolidone) and Polyimide (PI), and then to bake the substrates for a long period at high temperature (generally above 200 degrees) for curing the solvent in the alignment solution. Thus, PI alignment layers are formed on the surfaces of the substrates. As shown in FIG. 1, the traditional VA type liquid crystal display panel comprises: an upper substrate 10, a lower substrate 20 oppositely positioned to the upper substrate 10, a liquid crystal layer 50 sandwiched between the upper substrate 10 and the lower substrate 20 and PI alignment layers 30 formed at one side of the upper substrate 10 facing the lower substrate 20 and one side of the lower substrate 20 facing the upper substrate 10. However, because the VA liquid crystal display utilizes vertical twist liquid crystals and the birefraction difference of the liquid crystal molecules is larger, the issue of the color shift under large view angle is more serious.

For earning better wide view angle property for the VA liquid crystal display panel to improve the color shift issue, the multi-domain VA (MVA) technology is commonly utilized, which is to divide a sub pixel into many districts and drive the liquid crystals in respective districts to lie down toward different directions as applying voltage. Thus, the watch results from respective directions can be equal. There are many methods for realizing the MVA technology. Please refer to FIG. 2, FIG. 3 and FIG. 4. One of the methods is to process onside of the ITO pixel electrode 70 to be a pozidriv pattern. The common electrode 80 is a plane electrode which has uniform thickness and is uninterruptedly continuous. With the special ITO pixel electrode pattern, the tilt electric field can induce the liquid crystal molecules 50 to fell down toward different directions.

FIG. 2 is a top view diagram of one side of a lower substrate 20 in an MVA liquid crystal display panel. 210 and 220 respectively are a scan line and a data line. One sub pixel is divided into four areas by the pixel electrode 70. The ITO pixel electrode 70 comprises a pozidriv keel 701 and a pattern of pixel electrode branches 702 respectively extending in directions of 45°, 135°, −45° and −135° from the pozidriv keel 701 relative to the horizontal direction with spaced slits. FIG. 3 is a sectional diagram of an MVA type liquid crystal display panel corresponding to A-A portion shown in FIG. 2. The pixel electrode 70 with slits is positioned on the flat lower passivation layer 60. The plane common electrode 80 is positioned on the flat upper passivation layer 90. The PI alignment layers 30 cover on the pixel electrode 70 and the common electrode 80.

According to the transmittance formula of the VA liquid crystal display panel:

$$T = \frac{1}{2}\sin^2 2\Delta\Phi \sin^2 \frac{\Gamma}{2} \quad (1)$$

wherein T is the penetration rate, and ΔΦ is the included angle between the long axis of the liquid crystal and the polarizer, of which the efficiency is the maximum as the angle is 45°; Γ is the phase difference, i.e. the modulation result to the polarized light with the liquid crystal molecules driven by the electrical field.

the calculation formula of Γ is:

$$\Gamma = \cos(a) * 2\pi * \Delta n * d / \lambda \quad (2)$$

wherein a is the included angle between the long axis of the liquid crystal and the normal line of the substrate, and the volume is determined according to the electrical fielding affecting the liquid crystal molecules, and d is the cell gap, and Δn is the refractivity difference of the long, short axes of the liquid crystal.

According to the penetration rate formula, in the four areas of the sub pixel, the pixel electrode 70 comprises a pattern of pixel electrode branches 702 respectively extending in directions of 45°, 135°, −45° and −135° relative to the horizontal direction with spaced slits (the direction of the upper, lower polarizers respectively are 0°, 90°). The long axes of the liquid crystal molecules will respectively fell down toward the directions of 45°, 135°, −45° and −135° relative to the horizontal direction. In the penetration rate formula $\sin^2 2\Delta\Phi = 1$, the maximization of the penetration rate can be achieved.

However, the liquid crystal molecules 50 in the area corresponding to the pozidriv keel 701 of the pixel electrode 40 as shown in FIG. 2 always cannot fell down as that the liquid crystal molecules in the areas corresponding to the pattern of the pixel electrode branches 702 with spaced slits fell down toward the directions of 45°, 135°, −45° and −135° relative to the horizontal direction. Thus, as shown in FIG. 5, the liquid crystal molecules 50 in the area corresponding to the pozidriv keel 701 tilt toward 0° or fell down toward 90° to make $\sin^2 2\Delta\Phi = 0$ in the penetration rate formula. The display is in an opaque state to cause the entire penetration rate of the liquid crystal display panel to descend.

SUMMARY OF THE INVENTION

An objective of the present invention is to provide a pixel electrode, capable of solving the issue that the (cross) keel part of the pixel electrode causes the penetration rate reduction of the liquid crystal display panel to promote the penetration rate of the liquid crystal display panel for reducing the demand to the backlight brightness of the liquid crystal display panel and the usage power consumption.

Another objective of the present invention is to provide a liquid crystal display panel, of which the penetration rate is higher, and the demand to the backlight brightness is lower, and the usage power consumption is lower.

For realizing the aforesaid objectives, the present invention provides a pixel electrode, comprising: a rectangular frame, a plurality of first strip pixel electrode branches which are parallel with one another, and spaced with one another, a plurality of second strip pixel electrode branches which are parallel with one another, and spaced with one another, a plurality of third strip pixel electrode branches which are parallel with one another, and spaced with one another and a plurality of fourth strip pixel electrode branches which are parallel with one another, and spaced with one another, which are inside the rectangular frame, and connected with the rectangular frame;

the plurality of first, second, third and fourth strip pixel electrode branches are respectively tilted 45°, 135°, −135°, −45° relative to the horizontal direction; the plurality of first, second strip pixel electrode branches and the plurality of third, fourth strip pixel electrode branches are symmetrical relative to a vertical central line of the rectangular frame, and the plurality of first, fourth strip pixel electrode branches and the plurality of second, third strip pixel electrode branches are symmetrical relative to a horizontal central line of the rectangular frame;

a portion of the first strip pixel electrode branches orthogonally cross with the second strip pixel electrode branches of a corresponding number along the vertical central line of the rectangular frame, and the rest of the first strip pixel electrode branches orthogonally cross with the fourth strip pixel electrode branches of a corresponding number along the horizontal central line of the rectangular frame;

a portion of the second strip pixel electrode branches orthogonally cross with the first strip pixel electrode branches of a corresponding number along the vertical central line of the rectangular frame, and the rest of the second strip pixel electrode branches orthogonally cross with the third strip pixel electrode branches of a corresponding number along the horizontal central line of the rectangular frame;

a portion of the third strip pixel electrode branches orthogonally cross with the fourth strip pixel electrode branches of a corresponding number along the vertical central line of the rectangular frame, and the rest of the third strip pixel electrode branches orthogonally cross with the second strip pixel electrode branches of a corresponding number along the horizontal central line of the rectangular frame;

a portion of the fourth strip pixel electrode branches orthogonally cross with the third strip pixel electrode branches of a corresponding number along the vertical central line of the rectangular frame, and the rest of the fourth strip pixel electrode branches orthogonally cross with the first strip pixel electrode branches of a corresponding number along the horizontal central line of the rectangular frame.

At a central point of the rectangular frame, one first strip pixel electrode branch, one second strip pixel electrode branch, one third strip pixel electrode branch and one fourth strip pixel electrode branch are orthogonally connected with one another.

The pixel electrode further comprises a center block positioned at the central point of the rectangular frame, and the first, second strip pixel electrode branches, which are orthogonally connected with each other and closest to the central point of the rectangular frame, the second, third strip pixel electrode branches, which are orthogonally connected with each other and closest to the central point of the rectangular frame, the third, fourth strip pixel electrode branches, which are orthogonally connected with each other and closest to the central point of the rectangular frame, the fourth, first strip pixel electrode branches, which are orthogonally connected with each other and closest to the central point of the rectangular frame are respectively connected to the center block.

The center block appears to be a rectangular.

Material of the pixel electrode is ITO.

The present invention further provides a liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

the lower substrate comprises gate lines extending along the horizontal direction, data lines extending along the vertical direction and TFTs, and gates of the TFTs are coupled to the gate lines, sources are coupled to the data lines, and drains are coupled to the pixel electrode;

the pixel electrode, comprising: a rectangular frame, a plurality of first strip pixel electrode branches which are parallel with one another, and spaced with one another, a plurality of second strip pixel electrode branches which are parallel with one another, and spaced with one another, a plurality of third strip pixel electrode branches which are parallel with one another, and spaced with one another and a plurality of fourth strip pixel electrode branches which are parallel with one another, and spaced with one another, which are inside the rectangular frame, and connected with the rectangular frame;

the plurality of first, second, third and fourth strip pixel electrode branches are respectively tilted 45°, 135°, −135°, −45° relative to the horizontal direction; the plurality of first, second strip pixel electrode branches and the plurality of third, fourth strip pixel electrode branches are symmetrical relative to a vertical central line of the rectangular frame, and the plurality of first, fourth strip pixel electrode branches and the plurality of second, third strip pixel electrode branches are symmetrical relative to a horizontal central line of the rectangular frame;

a portion of the first strip pixel electrode branches orthogonally cross with the second strip pixel electrode branches of a corresponding number along the vertical central line of the rectangular frame, and the rest of the first strip pixel electrode branches orthogonally cross with the fourth strip pixel electrode branches of a corresponding number along the horizontal central line of the rectangular frame;

a portion of the second strip pixel electrode branches orthogonally cross with the first strip pixel electrode branches of a corresponding number along the vertical central line of the rectangular frame, and the rest of the second strip pixel electrode branches orthogonally cross with the third strip pixel electrode branches of a corresponding number along the horizontal central line of the rectangular frame;

a portion of the third strip pixel electrode branches orthogonally cross with the fourth strip pixel electrode branches of a corresponding number along the vertical central line of the rectangular frame, and the rest of the third strip pixel electrode branches orthogonally cross with the second strip pixel electrode branches of a corresponding number along the horizontal central line of the rectangular frame;

a portion of the fourth strip pixel electrode branches orthogonally cross with the third strip pixel electrode branches of a corresponding number along the vertical central line of the rectangular frame, and the rest of the fourth strip pixel electrode branches orthogonally cross with the first strip pixel electrode branches of a corresponding number along the horizontal central line of the rectangular frame.

At a central point of the rectangular frame, one first strip pixel electrode branch, one second strip pixel electrode branch, one third strip pixel electrode branch and one fourth strip pixel electrode branch are orthogonally connected with one another.

The pixel electrode further comprises a center block positioned at the central point of the rectangular frame, and the first, second strip pixel electrode branches, which are orthogonally connected with each other and closest to the central point of the rectangular frame, the second, third strip pixel electrode branches, which are orthogonally connected with each other and closest to the central point of the rectangular frame, the third, fourth strip pixel electrode branches, which are orthogonally connected with each other and closest to the central point of the rectangular frame, the fourth, first strip pixel electrode branches, which are orthogonally connected with each other and closest to the central point of the rectangular frame are respectively connected to the center block.

The center block appears to be a rectangular.

Material of the pixel electrode is ITO.

The gate lines, the data lines at least partially overlap with the rectangular frame of the pixel electrode.

The present invention further provides a liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

the lower substrate comprises gate lines extending along the horizontal direction, data lines extending along the vertical direction and TFTs, and gates of the TFTs are coupled to the gate lines, sources are coupled to the data lines, and drains are coupled to the pixel electrode;

the pixel electrode, comprising: a rectangular frame, a plurality of first strip pixel electrode branches which are parallel with one another, and spaced with one another, a plurality of second strip pixel electrode branches which are parallel with one another, and spaced with one another, a plurality of third strip pixel electrode branches which are parallel with one another, and spaced with one another and a plurality of fourth strip pixel electrode branches which are parallel with one another, and spaced with one another, which are inside the rectangular frame, and connected with the rectangular frame;

the plurality of first, second, third and fourth strip pixel electrode branches are respectively tilted 45°, 135°, −135°, −45° relative to the horizontal direction; the plurality of first, second strip pixel electrode branches and the plurality of third, fourth strip pixel electrode branches are symmetrical relative to a vertical central line of the rectangular frame, and the plurality of first, fourth strip pixel electrode branches and the plurality of second, third strip pixel electrode branches are symmetrical relative to a horizontal central line of the rectangular frame;

a portion of the first strip pixel electrode branches orthogonally cross with the second strip pixel electrode branches of a corresponding number along the vertical central line of the rectangular frame, and the rest of the first strip pixel electrode branches orthogonally cross with the fourth strip pixel electrode branches of a corresponding number along the horizontal central line of the rectangular frame;

a portion of the second strip pixel electrode branches orthogonally cross with the first strip pixel electrode branches of a corresponding number along the vertical central line of the rectangular frame, and the rest of the second strip pixel electrode branches orthogonally cross with the third strip pixel electrode branches of a corresponding number along the horizontal central line of the rectangular frame;

a portion of the third strip pixel electrode branches orthogonally cross with the fourth strip pixel electrode branches of a corresponding number along the vertical central line of the rectangular frame, and the rest of the third strip pixel electrode branches orthogonally cross with the second strip pixel electrode branches of a corresponding number along the horizontal central line of the rectangular frame;

a portion of the fourth strip pixel electrode branches orthogonally cross with the third strip pixel electrode branches of a corresponding number along the vertical central line of the rectangular frame, and the rest of the fourth strip pixel electrode branches orthogonally cross with the first strip pixel electrode branches of a corresponding number along the horizontal central line of the rectangular frame;

wherein at a central point of the rectangular frame, one first strip pixel electrode branch, one second strip pixel electrode branch, one third strip pixel electrode branch and one fourth strip pixel electrode branch are orthogonally connected with one another;

wherein the pixel electrode further comprises a center block positioned at the central point of the rectangular frame, and the first, second strip pixel electrode branches, which are orthogonally connected with each other and closest to the central point of the rectangular frame, the second, third strip pixel electrode branches, which are orthogonally connected with each other and closest to the central point of the rectangular frame, the third, fourth strip pixel electrode branches, which are orthogonally connected with each other and closest to the central point of the rectangular frame, the fourth, first strip pixel electrode branches, which are orthogonally connected with each other and closest to the central point of the rectangular frame are respectively connected to the center block;

wherein the gate lines, the data lines at least partially overlap with the rectangular frame of the pixel electrode.

The benefits of the present invention are: the present invention provides a pixel electrode, utilizing the structure not including the (cross) keel, capable of solving the issue that the (cross) keel part of the pixel electrode causes the penetration rate reduction of the liquid crystal display panel to promote the penetration rate of the liquid crystal display panel for reducing the demand to the backlight brightness of the liquid crystal display panel and the usage power consumption. The present invention provides a liquid crystal display panel, of which the pixel electrode thereof utilizes the structure not including the (cross) keel, and the penetration rate is higher, and the demand to the backlight brightness is lower, and the usage power consumption is lower.

In order to better understand the characteristics and technical aspect of the invention, please refer to the following detailed description of the present invention is concerned with the diagrams, however, provide reference to the accompanying drawings and description only and is not intended to be limiting of the invention.

BRIEF DESCRIPTION OF THE DRAWINGS

The technical solution and the beneficial effects of the present invention are best understood from the following detailed description with reference to the accompanying figures and embodiments.

In drawings.

DETAILED DESCRIPTION OF PREFERRED EMBODIMENTS

For better explaining the technical solution and the effect of the present invention, the present invention will be further described in detail with the accompanying drawings and the specific embodiments.

Figure 1:
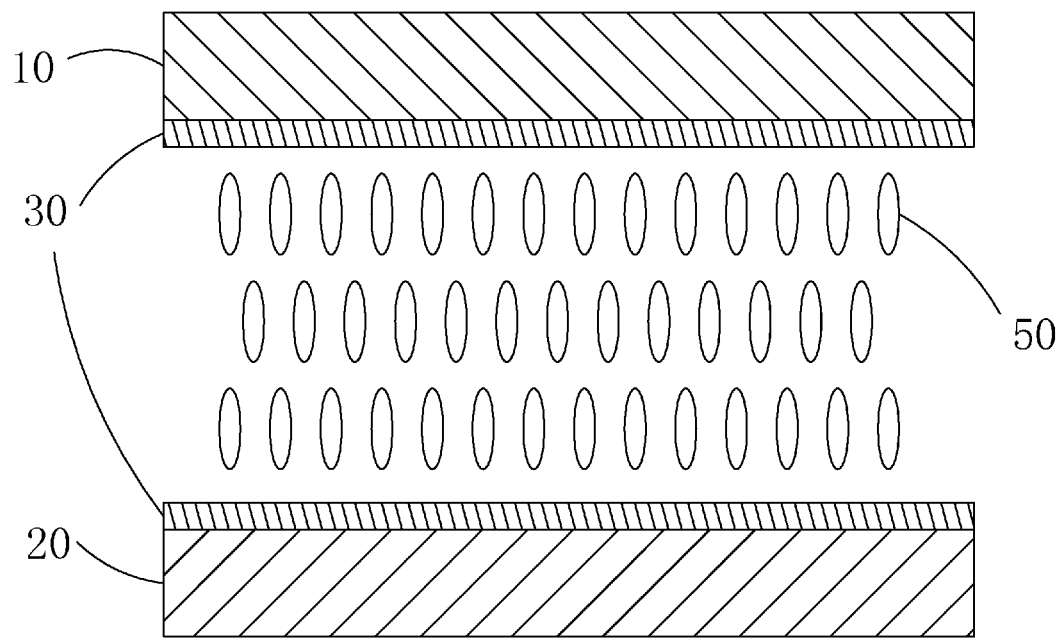
FIG. 1 is a sectional diagram of a VA type liquid crystal display panel according to prior art.
Figure 2:
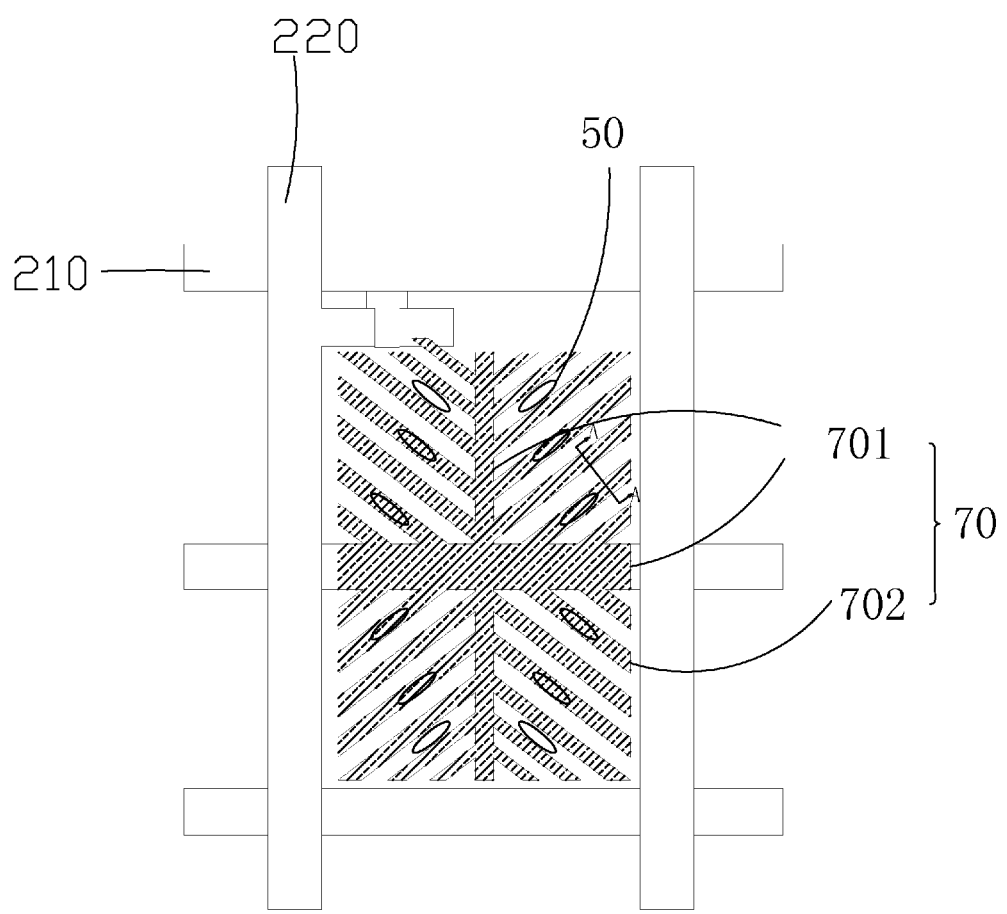
FIG. 2 is a top view diagram of one side of a lower substrate in an MVA liquid crystal display panel according to prior art.
Figure 3:
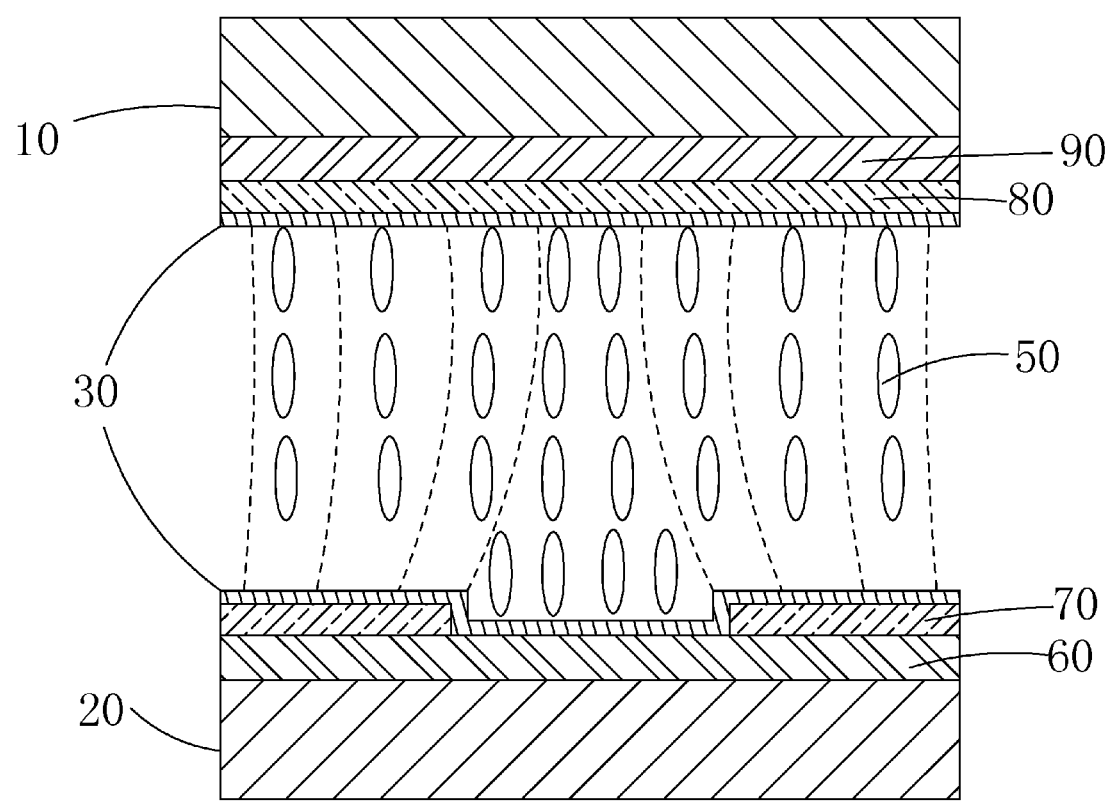
FIG. 3 is a sectional diagram of an MVA type liquid crystal display panel according to prior art corresponding to A-A portion shown in FIG. 2.
Figure 4:
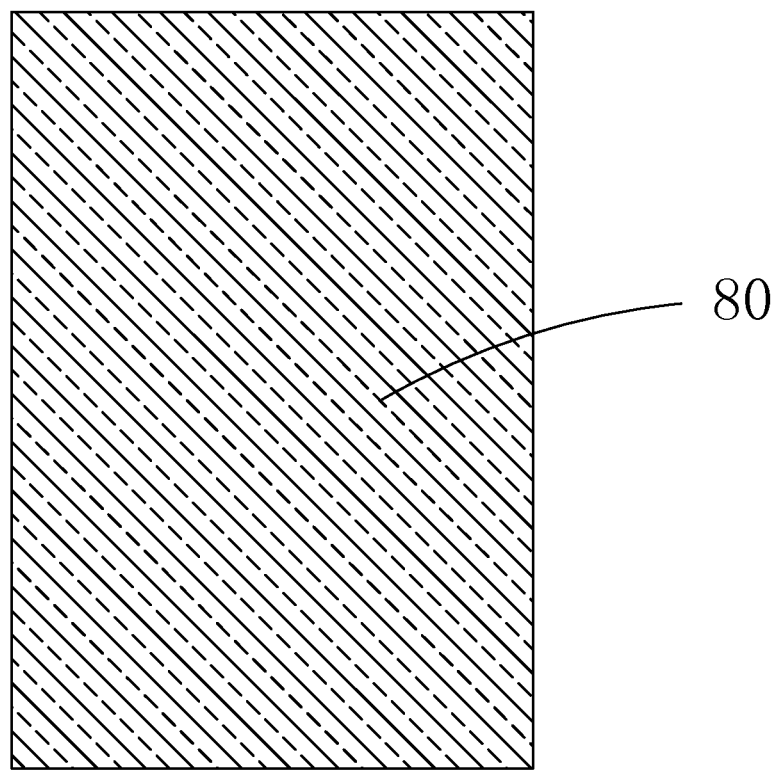
FIG. 4 is a plane diagram of a common electrode in the MVA type liquid crystal display panel shown in FIG. 3.
Figure 5:
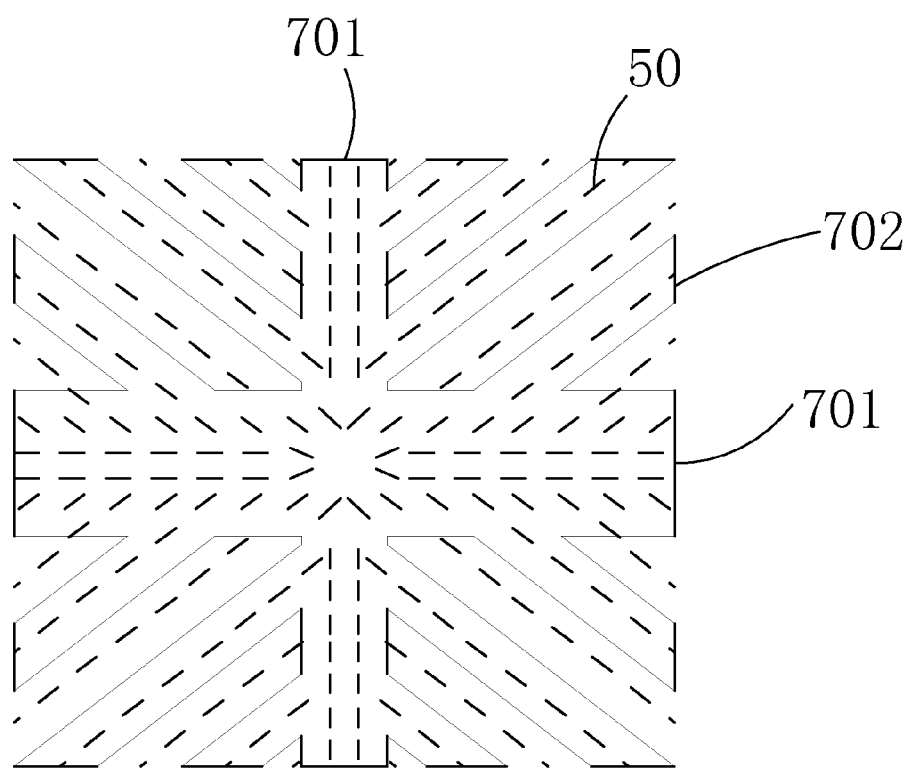
FIG. 5 is a felling direction diagram of liquid crystal molecules in the MVA type liquid crystal display panel shown in FIG. 3.
Figure 6:
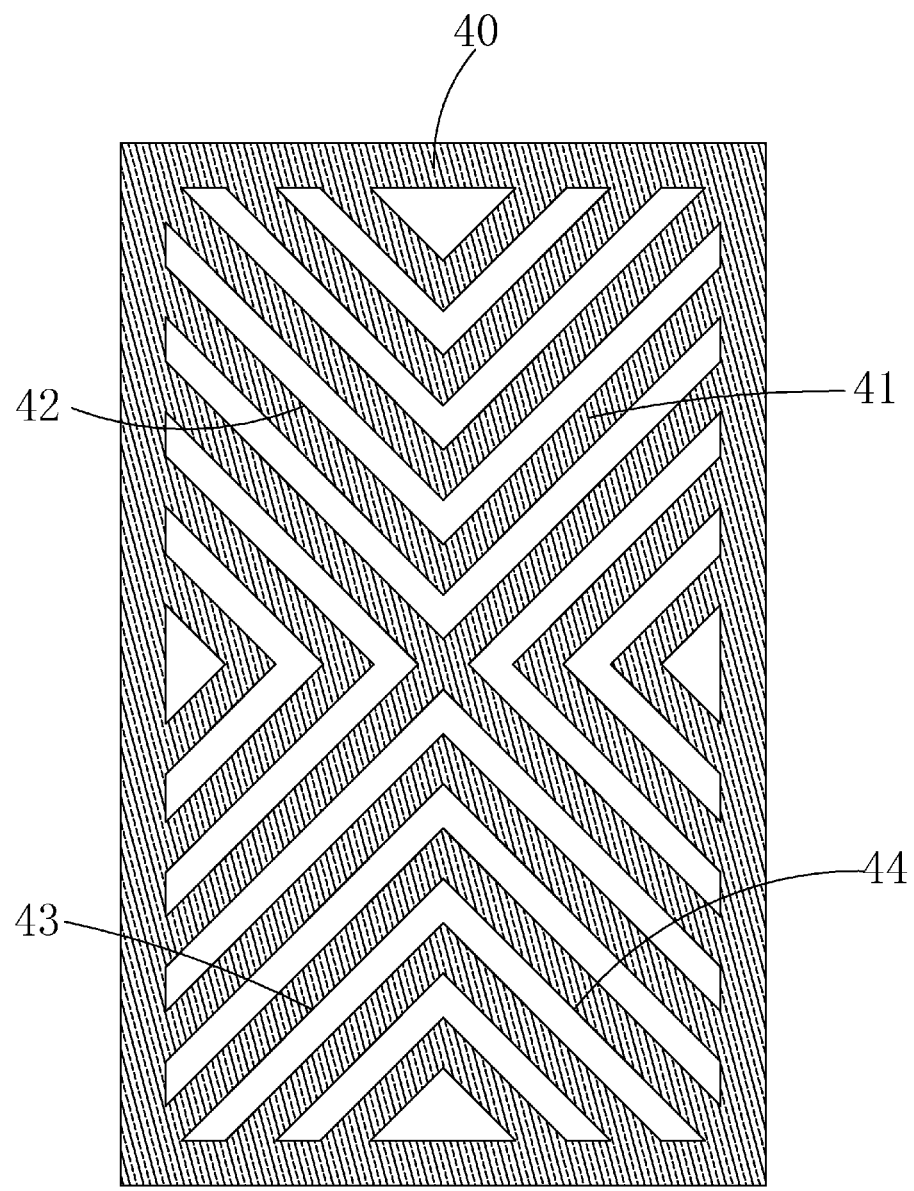
FIG. 6 is a plane diagram of a pixel electrode according to the first embodiment of the present invention.

The present invention first provides a pixel electrode. FIG. 6 shows a pixel electrode according to the first embodiment of the present invention, comprising: a rectangular frame 40, a plurality of first strip pixel electrode branches 41 which are parallel with one another, and spaced with one another, a plurality of second strip pixel electrode branches 42 which are parallel with one another, and spaced with one another, a plurality of third strip pixel electrode branches 43 which are parallel with one another, and spaced with one another and a plurality of fourth strip pixel electrode branches 44 which are parallel with one another, and spaced with one another, which are inside the rectangular frame 40, and connected with the rectangular frame 40.

The plurality of first, second, third and fourth strip pixel electrode branches 41, 42, 43, 44 are respectively tilted 45°, 135°, −135°, −45° relative to the horizontal direction; the plurality of first, second strip pixel electrode branches 41, 42 and the plurality of third, fourth strip pixel electrode branches 43, 44 are symmetrical relative to a vertical central line of the rectangular frame 40, and the plurality of first, fourth strip pixel electrode branches 41, 44 and the plurality of second, third strip pixel electrode branches 42, 43 are symmetrical relative to a horizontal central line of the rectangular frame 40.

Comparing the pixel electrode of the present invention with the pixel electrode according to prior art, the structure of the (cross) keel is not included but a portion of the first strip pixel electrode branches 41 orthogonally cross with the second strip pixel electrode branches 42 of a corresponding number along the vertical central line of the rectangular frame 40, and the rest of the first strip pixel electrode branches 41 orthogonally cross with the fourth strip pixel electrode branches 44 of a corresponding number along the horizontal central line of the rectangular frame 40; a portion of the second strip pixel electrode branches 42 orthogonally cross with the first strip pixel electrode branches 41 of a corresponding number along the vertical central line of the rectangular frame 40, and the rest of the second strip pixel electrode branches 42 orthogonally cross with the third strip pixel electrode branches 43 of a corresponding number along the horizontal central line of the rectangular frame 40; a portion of the third strip pixel electrode branches 43 orthogonally cross with the fourth strip pixel electrode branches 44 of a corresponding number along the vertical central line of the rectangular frame 40, and the rest of the third strip pixel electrode branches 43 orthogonally cross with the second strip pixel electrode branches 42 of a corresponding number along the horizontal central line of the rectangular frame 40; a portion of the fourth strip pixel electrode branches 44 orthogonally cross with the third strip pixel electrode branches 43 of a corresponding number along the vertical central line of the rectangular frame 40, and the rest of the fourth strip pixel electrode branches 44 orthogonally cross with the first strip pixel electrode branches 41 of a corresponding number along the horizontal central line of the rectangular frame 40.

In the first embodiment shown in FIG. 6, at a central point of the rectangular frame 40, one first strip pixel electrode branch 41, one second strip pixel electrode branch 42, one third strip pixel electrode branch 43 and one fourth strip pixel electrode branch 44 are orthogonally connected with one another.

Preferably, material of the pixel electrode is ITO.

As the pixel electrode of the present invention is applied in a liquid crystal display panel, the plurality of first, second, third and fourth strip pixel electrode branches 41, 42, 43, 44 respectively correspond to four areas of one sub pixel. As applying the voltage to the liquid crystal display panel, the pixel electrode of the present invention does not include the structure of the (cross) keel. The issue that the liquid crystal molecules in the area corresponding to the (cross) keel fell down 0° or 90° relative to the horizontal direction and make the penetration rate descend does not exist. The liquid crystal molecules in the four areas of one sub pixel respectively fell down 45°, 135°, −135°, −45° relative to the horizontal direction. There is $\sin^2 2\Delta\Phi=1$ in any area. Accordingly, the liquid crystal efficiency is maximized and the penetration rate is promoted.

Figure 7:
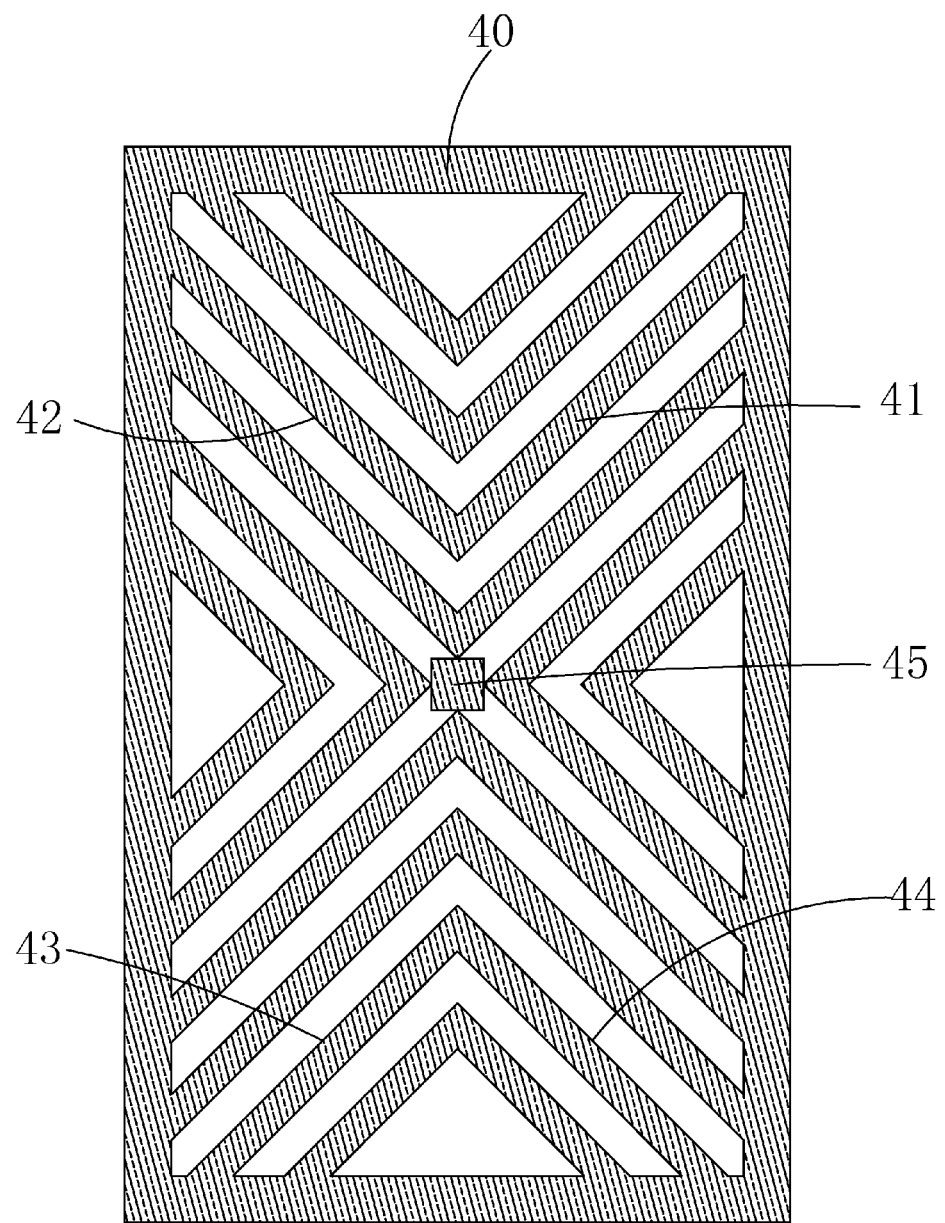
FIG. 7 is a plane diagram of a pixel electrode according to the second embodiment of the present invention.

FIG. 7 shows a pixel electrode according to the second embodiment of the present invention. The difference of the second embodiment from the first embodiment is: the pixel electrode further comprises a center block 45 positioned at the central point of the rectangular frame 40, and the first, second strip pixel electrode branches 41, 42, which are orthogonally connected with each other and closest to the central point of the rectangular frame 40, the second, third strip pixel electrode branches 42, 43, which are orthogonally connected with each other and closest to the central point of the rectangular frame 40, the third, fourth strip pixel electrode branches 43, 44, which are orthogonally connected with each other and closest to the central point of the rectangular frame 40, the fourth, first strip pixel electrode branches 44, 41, which are orthogonally connected with each other and closest to the central point of the rectangular frame 40 are respectively connected to the center block 45.

Preferably, the center block 45 appears to be a rectangular.

The reset is the same as the first embodiment. The repeated description is omitted here.

Figure 8:
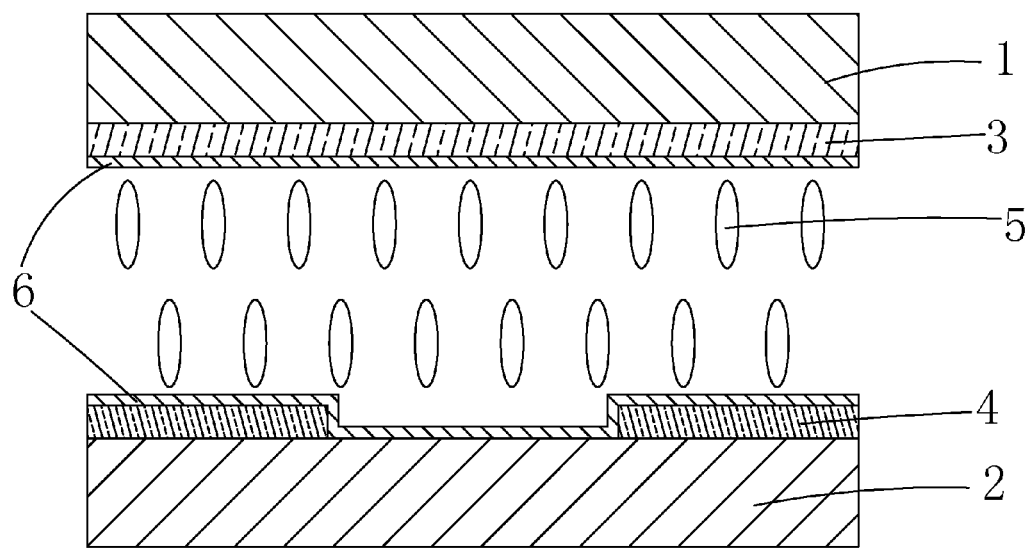
FIG. 8 is a sectional structure diagram of a liquid crystal display panel according to the present invention.

On the basis of the same inventive idea, the present invention further provides a liquid crystal display panel. Please refer to FIG. 8. The liquid crystal display panel of the present invention comprises an upper substrate 1, a lower substrate 2 oppositely positioned to the upper substrate 1, a common electrode 3 positioned at one side of the upper substrate 1 facing the lower substrate 2, a pixel electrode 4 positioned at one side of the lower substrate 2 facing the upper substrate 1 and a liquid crystal layer 5 sandwiched between the common electrode 3 and the pixel electrode 4. FIG. 8 further shows an alignment layer 6 covering the common electrode 3 and the pixel electrode 4 for implementing alignment to the liquid crystal layer 5. Certainly, it is possible to not to provide the alignment layer 6 but the polymer-stabilized vertical alignment (PSVA) is utilized to implement alignment to the liquid crystal layer 5.

Figure 9:
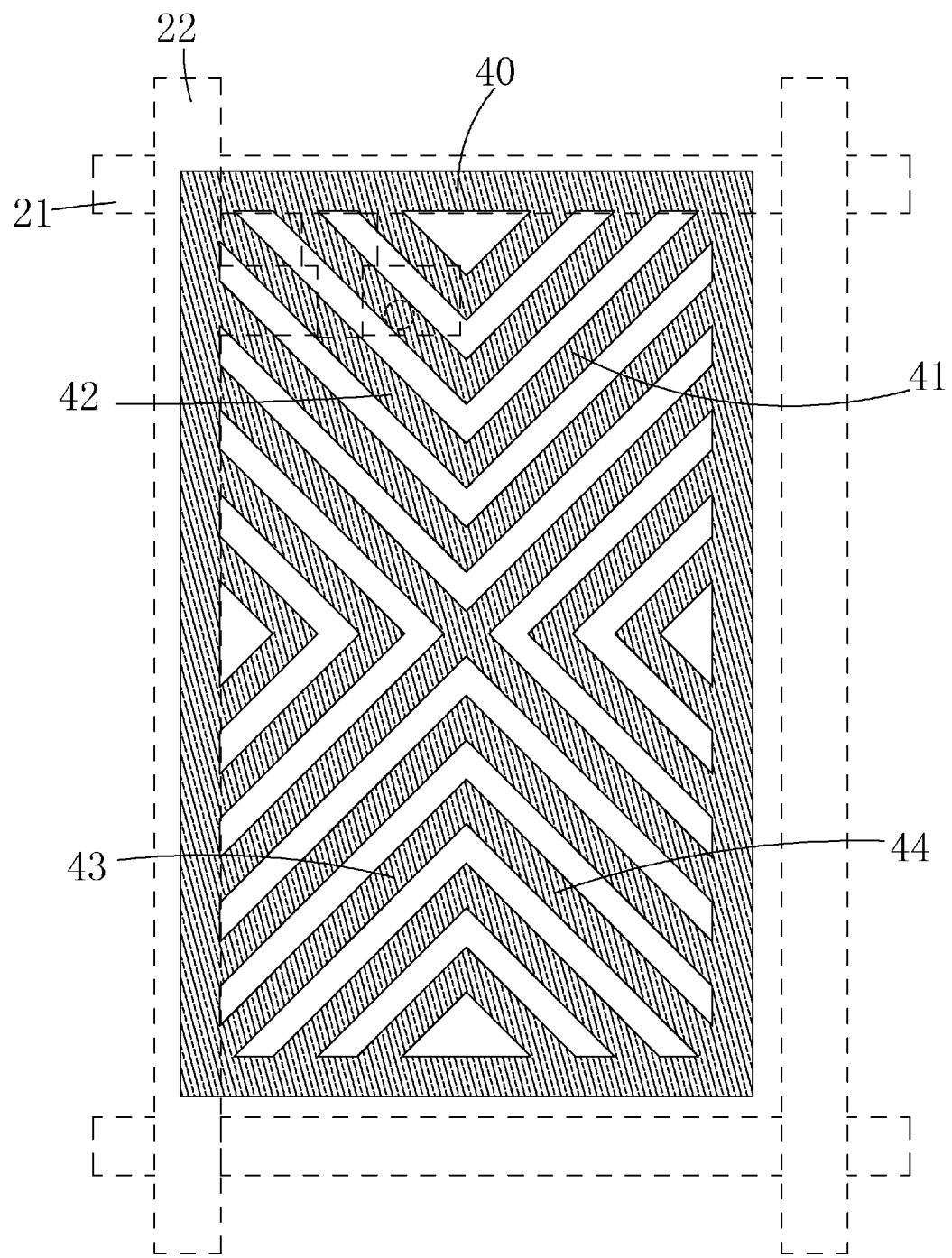
FIG. 9 is one top view diagram of one side of a lower substrate in the liquid crystal display panel according to the present invention.
Figure 10:
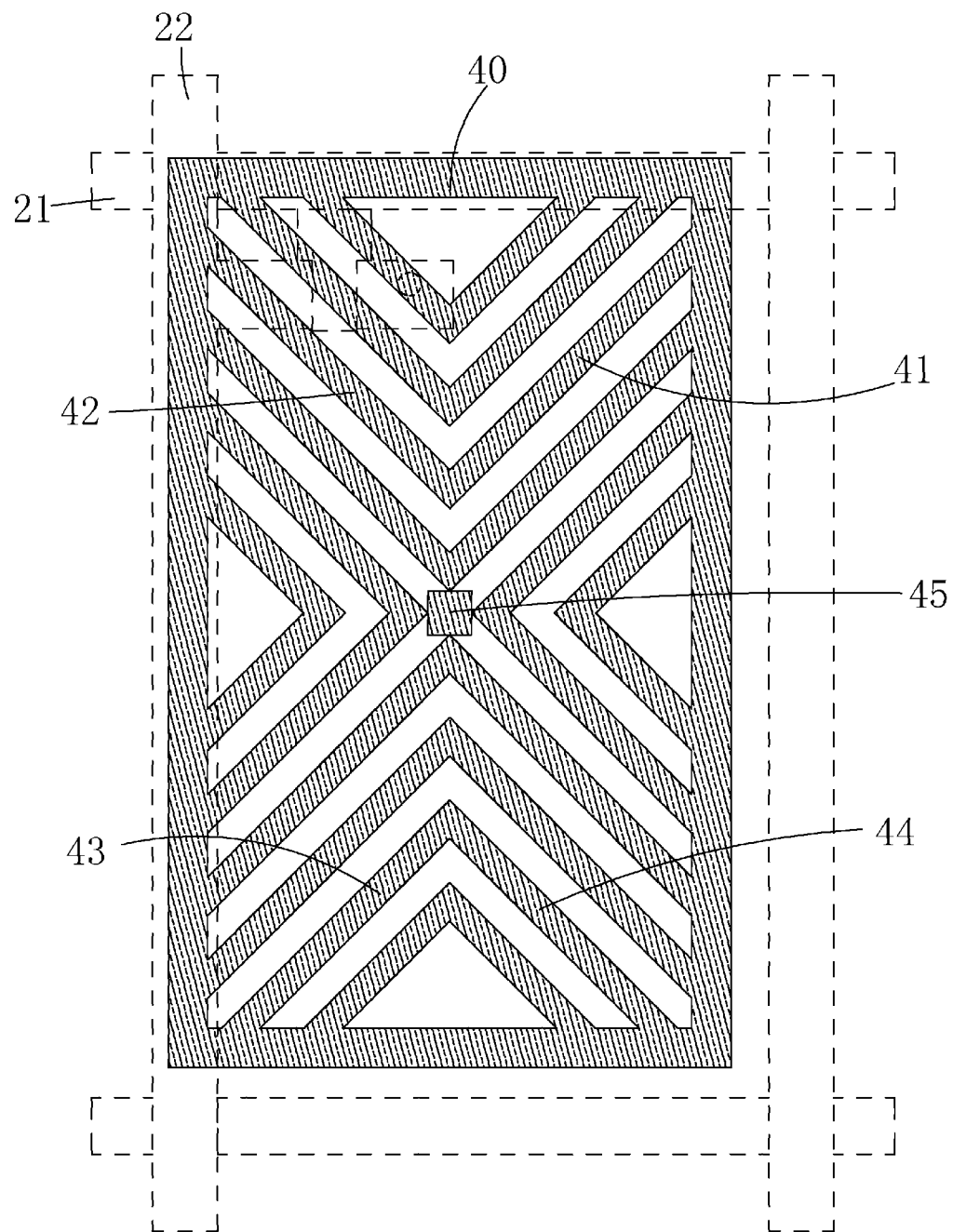
FIG. 10 is another top view diagram of one side of the lower substrate in the liquid crystal display panel according to the present invention.

Please refer to FIG. 9 or FIG. 10. The lower substrate 2 comprises gate lines 21 extending along the horizontal direction, data lines 22 extending along the vertical direction and TFTs, and gates of the TFTs are coupled to the gate lines 21, sources are coupled to the data lines 22, and drains are coupled to the pixel electrode 4.

AS shown in FIG. 9 or FIG. 10, the pixel electrode 4 is different from the pixel electrode including the structure of the (cross) keel according to prior art, and comprises: a rectangular frame 40, a plurality of first strip pixel electrode branches 41 which are parallel with one another, and spaced with one another, a plurality of second strip pixel electrode branches 42 which are parallel with one another, and spaced with one another, a plurality of third strip pixel electrode branches 43 which are parallel with one another, and spaced with one another and a plurality of fourth strip pixel electrode branches 44 which are parallel with one another, and spaced with one another, which are inside the rectangular frame 40, and connected with the rectangular frame 40.

The plurality of first, second, third and fourth strip pixel electrode branches 41, 42, 43, 44 are respectively tilted 45°, 135°, −135°, −45° relative to the horizontal direction; the plurality of first, second strip pixel electrode branches 41, 42 and the plurality of third, fourth strip pixel electrode branches 43, 44 are symmetrical relative to a vertical central line of the rectangular frame 40, and the plurality of first, fourth strip pixel electrode branches 41, 44 and the plurality of second, third strip pixel electrode branches 42, 43 are symmetrical relative to a horizontal central line of the rectangular frame 40.

A portion of the first strip pixel electrode branches 41 orthogonally cross with the second strip pixel electrode branches 42 of a corresponding number along the vertical central line of the rectangular frame 40, and the rest of the first strip pixel electrode branches 41 orthogonally cross with the fourth strip pixel electrode branches 44 of a corresponding number along the horizontal central line of the rectangular frame 40; a portion of the second strip pixel electrode branches 42 orthogonally cross with the first strip pixel electrode branches 41 of a corresponding number along the vertical central line of the rectangular frame 40, and the rest of the second strip pixel electrode branches 42 orthogonally cross with the third strip pixel electrode branches 43 of a corresponding number along the horizontal central line of the rectangular frame 40; a portion of the third strip pixel electrode branches 43 orthogonally cross with the fourth strip pixel electrode branches 44 of a corresponding number along the vertical central line of the rectangular frame 40, and the rest of the third strip pixel electrode branches 43 orthogonally cross with the second strip pixel electrode branches 42 of a corresponding number along the horizontal central line of the rectangular frame 40; a portion of the fourth strip pixel electrode branches 44 orthogonally cross with the third strip pixel electrode branches 43 of a corresponding number along the vertical central line of the rectangular frame 40, and the rest of the fourth strip pixel electrode branches 44 orthogonally cross with the first strip pixel electrode branches 41 of a corresponding number along the horizontal central line of the rectangular frame 40.

The pixel electrode 4 can be shown as in FIG. 9, at a central point of the rectangular frame 40, one first strip pixel electrode branch 41, one second strip pixel electrode branch 42, one third strip pixel electrode branch 43 and one fourth strip pixel electrode branch 44 are orthogonally connected with one another.

The pixel electrode 4 also can be shown as in FIG. 10, and a center block 45 is positioned at the central point of the rectangular frame 40, and the first, second strip pixel electrode branches 41, 42, which are orthogonally connected with each other and closest to the central point of the rectangular frame 40, the second, third strip pixel electrode branches 42, 43, which are orthogonally connected with each other and closest to the central point of the rectangular frame 40, the third, fourth strip pixel electrode branches 43, 44, which are orthogonally connected with each other and closest to the central point of the rectangular frame 40, the fourth, first strip pixel electrode branches 44, 41, which are orthogonally connected with each other and closest to the central point of the rectangular frame 40 are respectively connected to the center block 45. Preferably, the center block 45 appears to be a rectangular.

Significantly, the gate lines 21, the data lines 22 at least partially overlap with the rectangular frame 40 of the pixel electrode 4 to make the most of the active display area.

In the liquid crystal display panel of the present invention, the plurality of first, second, third and fourth strip pixel electrode branches 41, 42, 43, 44 of the pixel electrode 4 respectively correspond to four areas of one sub pixel. As applying the voltage to the liquid crystal display panel, the pixel electrode 4 does not include the structure of the (cross) keel. The issue that the liquid crystal molecules in the area corresponding to the (cross) keel fell down 0° or 90° relative to the horizontal direction and make the penetration rate descends does not exist. The liquid crystal molecules in the four areas of one sub pixel respectively fell down 45°, 135°, −135°, −45° relative to the horizontal direction. There is $\sin^2 2\Delta\Phi=1$ in any area. Accordingly, the liquid crystal efficiency is maximized, and the penetration rate is promoted, and the demand to the backlight brightness is lower, and the usage power consumption is lower.

In conclusion, the present invention provides a pixel electrode, utilizing the structure not including the (cross)

keel, capable of solving the issue that the (cross) keel part of the pixel electrode causes the penetration rate reduction of the liquid crystal display panel to promote the penetration rate of the liquid crystal display panel for reducing the demand to the backlight brightness of the liquid crystal display panel and the usage power consumption. In the liquid crystal display panel of the present invention, the pixel electrode thereof utilizes the structure not including the (cross) keel, and the penetration rate is higher, and the demand to the backlight brightness is lower, and the usage power consumption is lower.

Above are only specific embodiments of the present invention, the scope of the present invention is not limited to this, and to any persons who are skilled in the art, change or replacement which is easily derived should be covered by the protected scope of the invention. Thus, the protected scope of the invention should go by the subject claims.

What is claimed is:

1. A pixel electrode, comprising: a rectangular frame, a plurality of first strip pixel electrode branches which are parallel with one another, and spaced with one another, a plurality of second strip pixel electrode branches which are parallel with one another, and spaced with one another, a plurality of third strip pixel electrode branches which are parallel with one another, and spaced with one another and a plurality of fourth strip pixel electrode branches which are parallel with one another, and spaced with one another, which are inside the rectangular frame, and connected with the rectangular frame;

the plurality of first, second, third and fourth strip pixel electrode branches are respectively tilted 45°, 135°, −135°, −45° relative to the horizontal direction; the plurality of first, second strip pixel electrode branches and the plurality of third, fourth strip pixel electrode branches are symmetrical relative to a vertical central line of the rectangular frame, and the plurality of first, fourth strip pixel electrode branches and the plurality of second, third strip pixel electrode branches are symmetrical relative to a horizontal central line of the rectangular frame;

a portion of the first strip pixel electrode branches orthogonally cross with the second strip pixel electrode branches of a corresponding number along the vertical central line of the rectangular frame, and the rest of the first strip pixel electrode branches orthogonally cross with the fourth strip pixel electrode branches of a corresponding number along the horizontal central line of the rectangular frame;

a portion of the second strip pixel electrode branches orthogonally cross with the first strip pixel electrode branches of a corresponding number along the vertical central line of the rectangular frame, and the rest of the second strip pixel electrode branches orthogonally cross with the third strip pixel electrode branches of a corresponding number along the horizontal central line of the rectangular frame;

a portion of the third strip pixel electrode branches orthogonally cross with the fourth strip pixel electrode branches of a corresponding number along the vertical central line of the rectangular frame, and the rest of the third strip pixel electrode branches orthogonally cross with the second strip pixel electrode branches of a corresponding number along the horizontal central line of the rectangular frame;

a portion of the fourth strip pixel electrode branches orthogonally cross with the third strip pixel electrode branches of a corresponding number along the vertical central line of the rectangular frame, and the rest of the fourth strip pixel electrode branches orthogonally cross with the first strip pixel electrode branches of a corresponding number along the horizontal central line of the rectangular frame, wherein the pixel electrode further comprises a center block positioned at the central point of the rectangular frame, and the first, second strip pixel electrode branches, which are orthogonally connected with each other and closest to the central point of the rectangular frame, the second, third strip pixel electrode branches, which are orthogonally connected with each other and closest to the central point of the rectangular frame, the third, fourth strip pixel electrode branches, which are orthogonally connected with each other and closest to the central point of the rectangular frame, the fourth, first strip pixel electrode branches, which are orthogonally connected with each other and closest to the central point of the rectangular frame are respectively connected to the center block.

2. The pixel electrode according to claim 1, wherein at a central point of the rectangular frame, one first strip pixel electrode branch, one second strip pixel electrode branch, one third strip pixel electrode branch and one fourth strip pixel electrode branch are orthogonally connected with one another.

3. The pixel electrode according to claim 1, wherein the center block appears to be a rectangular.

4. The pixel electrode according to claim 1, wherein material of the pixel electrode is ITO.

5. A liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

the lower substrate comprises gate lines extending along the horizontal direction, data lines extending along the vertical direction and TFTs, and gates of the TFTs are coupled to the gate lines, sources are coupled to the data lines, and drains are coupled to the pixel electrode;

the pixel electrode, comprising: a rectangular frame, a plurality of first strip pixel electrode branches which are parallel with one another, and spaced with one another, a plurality of second strip pixel electrode branches which are parallel with one another, and spaced with one another, a plurality of third strip pixel electrode branches which are parallel with one another, and spaced with one another and a plurality of fourth strip pixel electrode branches which are parallel with one another, and spaced with one another, which are inside the rectangular frame, and connected with the rectangular frame;

the plurality of first, second, third and fourth strip pixel electrode branches are respectively tilted 45°, 135°, −135°, −45° relative to the horizontal direction; the plurality of first, second strip pixel electrode branches and the plurality of third, fourth strip pixel electrode branches are symmetrical relative to a vertical central line of the rectangular frame, and the plurality of first, fourth strip pixel electrode branches and the plurality of second, third strip pixel electrode branches are symmetrical relative to a horizontal central line of the rectangular frame;

a portion of the first strip pixel electrode branches orthogonally cross with the second strip pixel electrode branches of a corresponding number along the vertical central line of the rectangular frame, and the rest of the first strip pixel electrode branches orthogonally cross with the fourth strip pixel electrode branches of a corresponding number along the horizontal central line of the rectangular frame;

a portion of the second strip pixel electrode branches orthogonally cross with the first strip pixel electrode branches of a corresponding number along the vertical central line of the rectangular frame, and the rest of the second strip pixel electrode branches orthogonally cross with the third strip pixel electrode branches of a corresponding number along the horizontal central line of the rectangular frame;

a portion of the third strip pixel electrode branches orthogonally cross with the fourth strip pixel electrode branches of a corresponding number along the vertical central line of the rectangular frame, and the rest of the third strip pixel electrode branches orthogonally cross with the second strip pixel electrode branches of a corresponding number along the horizontal central line of the rectangular frame;

a portion of the fourth strip pixel electrode branches orthogonally cross with the third strip pixel electrode branches of a corresponding number along the vertical central line of the rectangular frame, and the rest of the fourth strip pixel electrode branches orthogonally cross with the first strip pixel electrode branches of a corresponding number along the horizontal central line of the rectangular frame, wherein the pixel electrode further comprises a center block positioned at the central point of the rectangular frame, and the first, second strip pixel electrode branches, which are orthogonally connected with each other and closest to the central point of the rectangular frame, the second, third strip pixel electrode branches, which are orthogonally connected with each other and closest to the central point of the rectangular frame, the third, fourth strip pixel electrode branches, which are orthogonally connected with each other and closest to the central point of the rectangular frame, the fourth, first strip pixel electrode branches, which are orthogonally connected with each other and closest to the central point of the rectangular frame are respectively connected to the center block.

6. The liquid crystal display panel according to claim 5, wherein at a central point of the rectangular frame, one first strip pixel electrode branch, one second strip pixel electrode branch, one third strip pixel electrode branch and one fourth strip pixel electrode branch are orthogonally connected with one another.

7. The liquid crystal display panel according to claim 5, wherein the center block appears to be a rectangular.

8. The liquid crystal display panel according to claim 5, wherein the gate lines, the data lines at least partially overlap with the rectangular frame of the pixel electrode.

9. A liquid crystal display panel, comprising an upper substrate, a lower substrate oppositely positioned to the upper substrate, a common electrode positioned at one side of the upper substrate facing the lower substrate, a pixel electrode positioned at one side of the lower substrate facing the upper substrate and a liquid crystal layer sandwiched between the common electrode and the pixel electrode;

the lower substrate comprises gate lines extending along the horizontal direction, data lines extending along the vertical direction and TFTs, and gates of the TFTs are coupled to the gate lines, sources are coupled to the data lines, and drains are coupled to the pixel electrode;

the pixel electrode, comprising: a rectangular frame, a plurality of first strip pixel electrode branches which are parallel with one another, and spaced with one another, a plurality of second strip pixel electrode branches which are parallel with one another, and spaced with one another, a plurality of third strip pixel electrode branches which are parallel with one another, and spaced with one another and a plurality of fourth strip pixel electrode branches which are parallel with one another, and spaced with one another, which are inside the rectangular frame, and connected with the rectangular frame;

the plurality of first, second, third and fourth strip pixel electrode branches are respectively tilted 45°, 135°, −135°, −45° relative to the horizontal direction; the plurality of first, second strip pixel electrode branches and the plurality of third, fourth strip pixel electrode branches are symmetrical relative to a vertical central line of the rectangular frame, and the plurality of first, fourth strip pixel electrode branches and the plurality of second, third strip pixel electrode branches are symmetrical relative to a horizontal central line of the rectangular frame;

a portion of the first strip pixel electrode branches orthogonally cross with the second strip pixel electrode branches of a corresponding number along the vertical central line of the rectangular frame, and the rest of the first strip pixel electrode branches orthogonally cross with the fourth strip pixel electrode branches of a corresponding number along the horizontal central line of the rectangular frame;

a portion of the second strip pixel electrode branches orthogonally cross with the first strip pixel electrode branches of a corresponding number along the vertical central line of the rectangular frame, and the rest of the second strip pixel electrode branches orthogonally cross with the third strip pixel electrode branches of a corresponding number along the horizontal central line of the rectangular frame;

a portion of the third strip pixel electrode branches orthogonally cross with the fourth strip pixel electrode branches of a corresponding number along the vertical central line of the rectangular frame, and the rest of the third strip pixel electrode branches orthogonally cross with the second strip pixel electrode branches of a corresponding number along the horizontal central line of the rectangular frame;

a portion of the fourth strip pixel electrode branches orthogonally cross with the third strip pixel electrode branches of a corresponding number along the vertical central line of the rectangular frame, and the rest of the fourth strip pixel electrode branches orthogonally cross with the first strip pixel electrode branches of a corresponding number along the horizontal central line of the rectangular frame;

wherein at a central point of the rectangular frame, one first strip pixel electrode branch, one second strip pixel electrode branch, one third strip pixel electrode branch and one fourth strip pixel electrode branch are orthogonally connected with one another;

wherein the pixel electrode further comprises a center block positioned at the central point of the rectangular frame, and the first, second strip pixel electrode branches, which are orthogonally connected with each other and closest to the central point of the rectangular frame, the second, third strip pixel electrode branches, which are orthogonally connected with each other and closest to the central point of the rectangular frame, the third, fourth strip pixel electrode branches, which are orthogonally connected with each other and closest to the central point of the rectangular frame, the fourth, first strip pixel electrode branches, which are orthogonally connected with each other and closest to the central point of the rectangular frame are respectively connected to the center block;

wherein the gate lines, the data lines at least partially overlap with the rectangular frame of the pixel electrode.

10. The liquid crystal display panel according to claim 9, wherein the center block appears to be a rectangular.

* * * * *